(No Model.)　　　　　　W. M. DUCKER.　　　　5 Sheets—Sheet 1.
PORTABLE HOUSE.
No. 355,441.　　　　　　　　　　　　Patented Jan. 4, 1887.
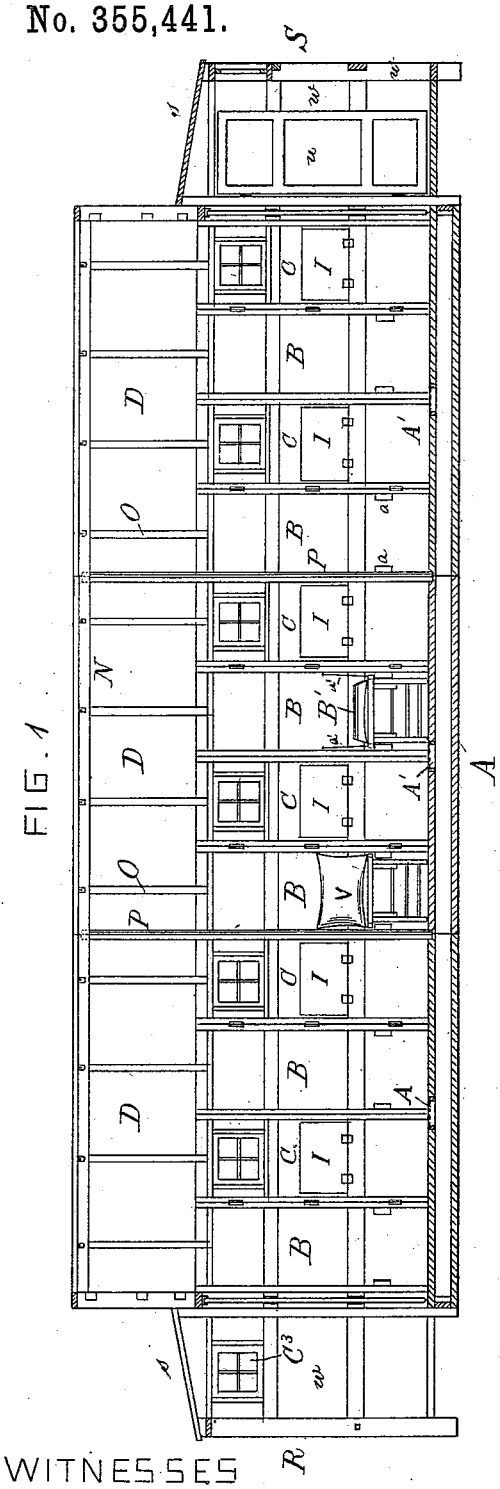

(No Model.) 5 Sheets—Sheet 2.
W. M. DUCKER.
PORTABLE HOUSE.
No. 355,441. Patented Jan. 4, 1887.
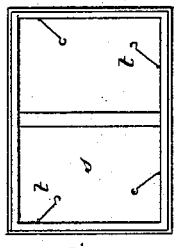
FIG. 9.
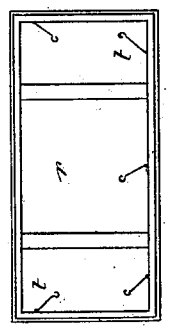
FIG. 8.
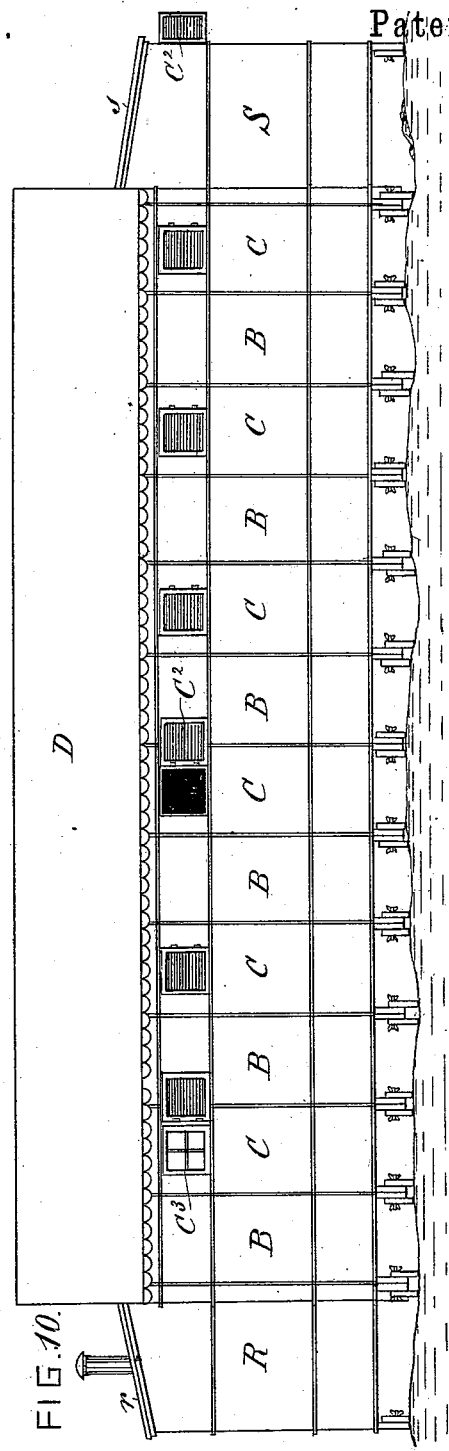
FIG. 10.
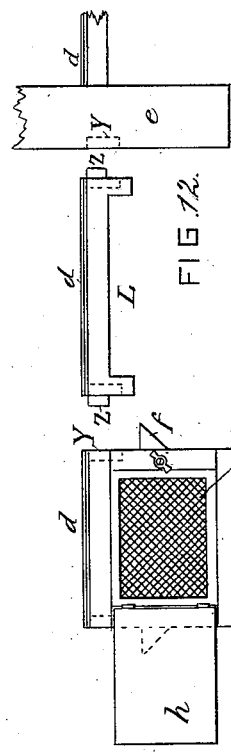
FIG. 12.
FIG. 11.
WITNESSES
Tallmadge W. Foster.
Arthur C. Maclay.
INVENTOR
William M. Ducker
by Augustus T. Gurlitz
Attorney.

(No Model.) 5 Sheets—Sheet 3.
W. M. DUCKER.
PORTABLE HOUSE.
No. 355,441. Patented Jan. 4, 1887.
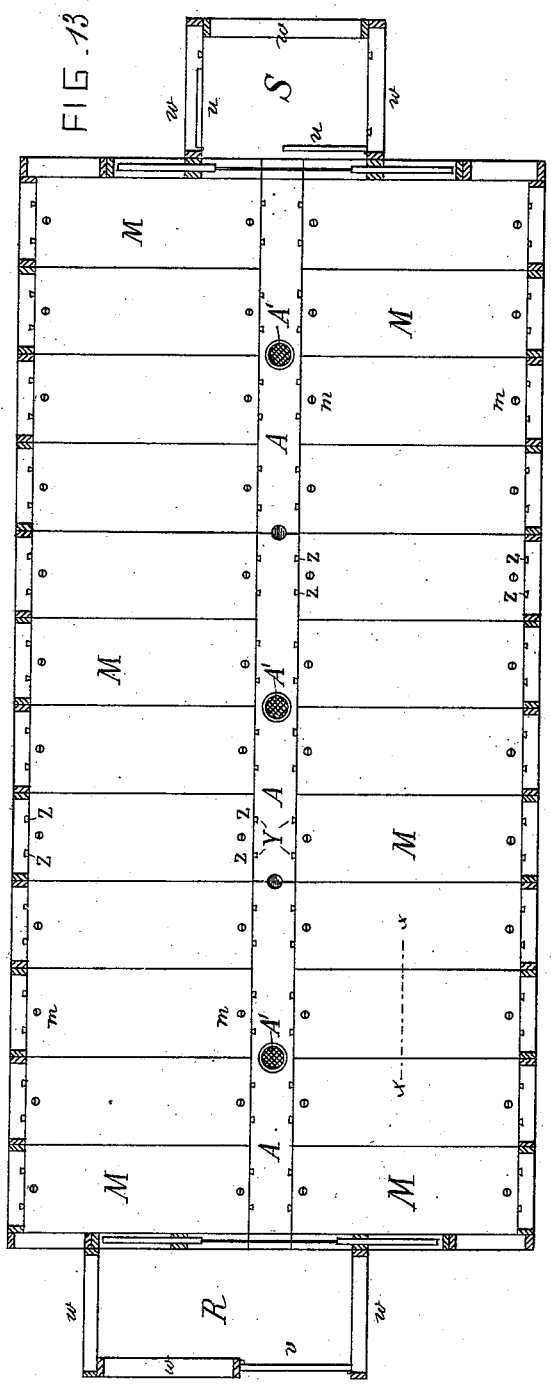
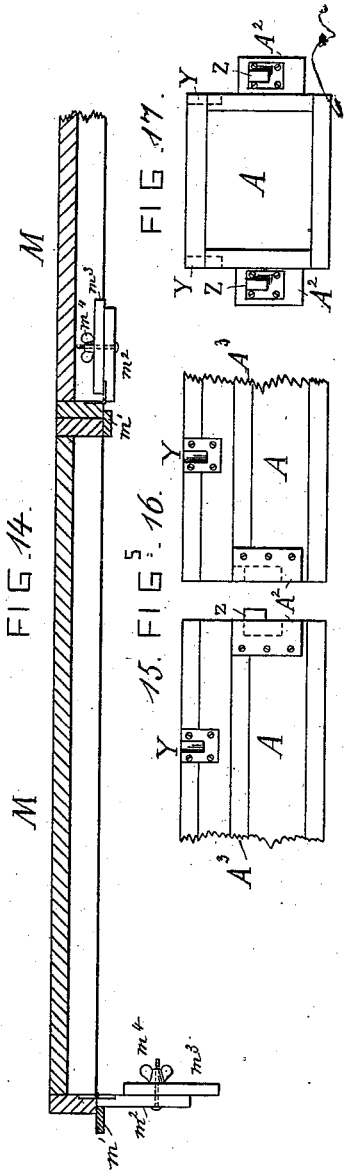
WITNESSES
Tallmadge W. Foster.
Arthur C. Maclay.
INVENTOR
William M. Ducker
by Augustus T. Gurlitz
Attorney (No Model.) 5 Sheets—Sheet 4.
W. M. DUCKER.
PORTABLE HOUSE.
No. 355,441. Patented Jan. 4, 1887.
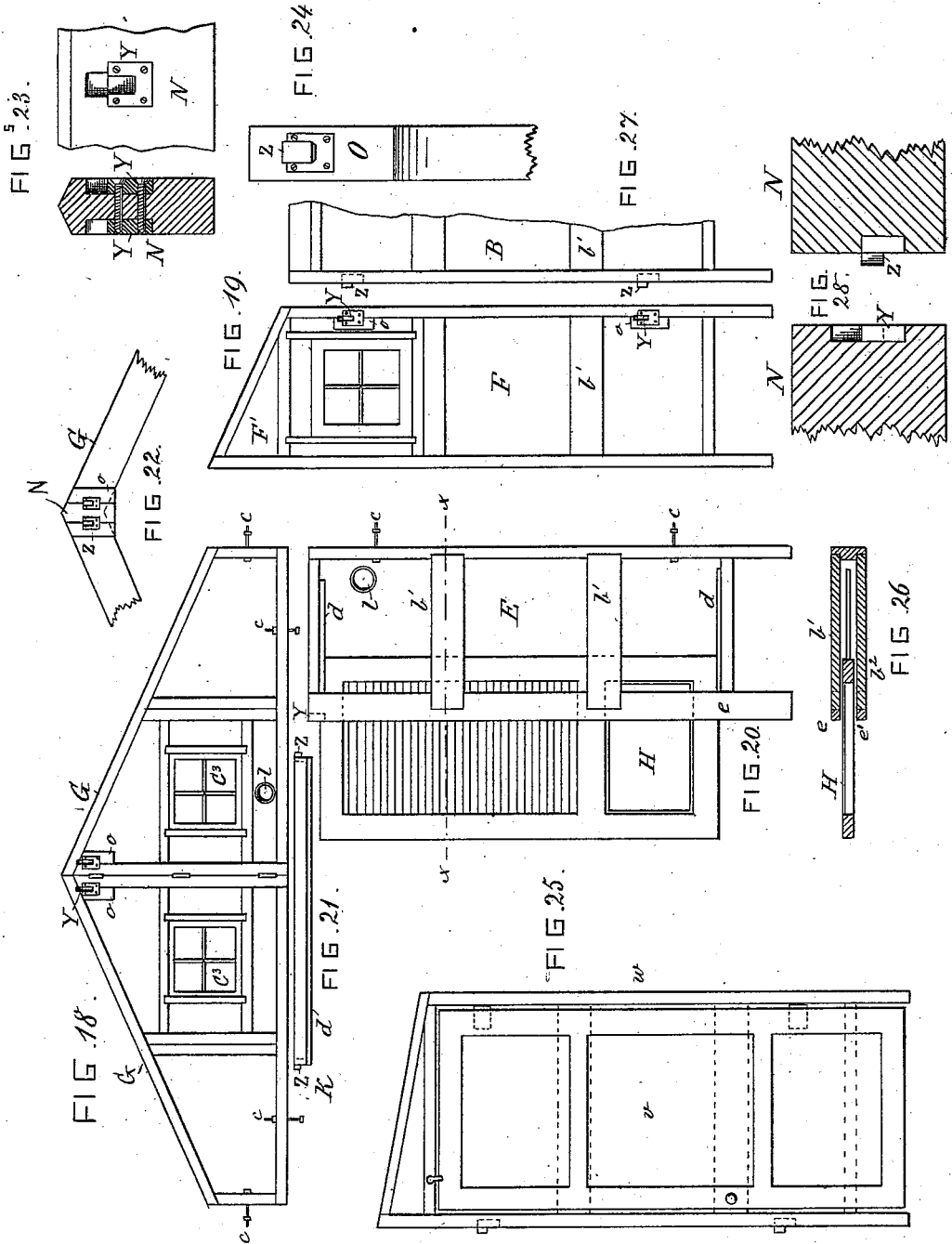

(No Model.) 5 Sheets—Sheet 5.
W. M. DUCKER.
PORTABLE HOUSE.
No. 355,441. Patented Jan. 4, 1887.
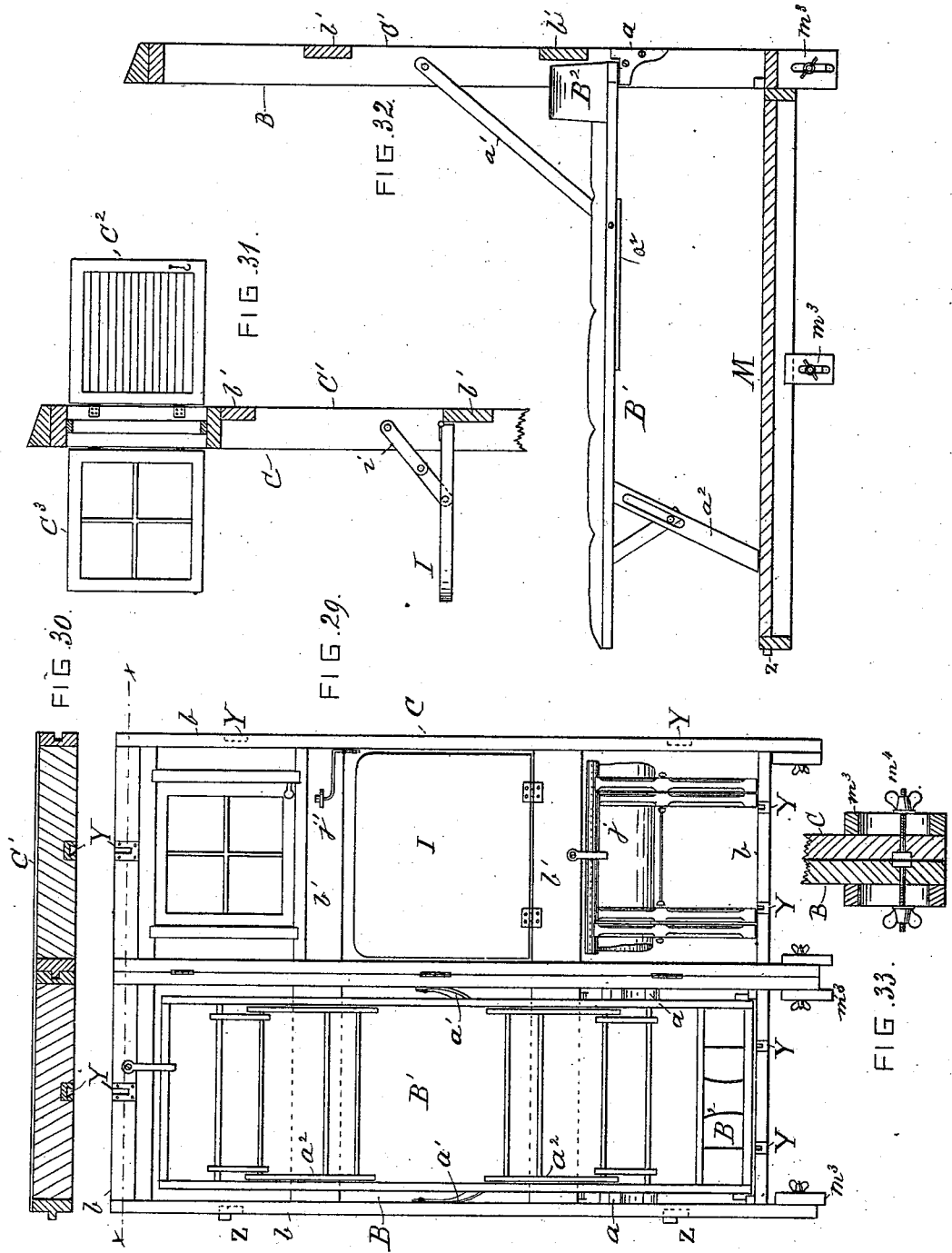
WITNESSES
Tallmadge W. Foster
Arthur C. Maclay
INVENTOR
William M. Ducker
by Augustus T. Gurlitz
Attorney

UNITED STATES PATENT OFFICE.

WILLIAM M. DUCKER, OF NEW YORK, N. Y.

PORTABLE HOUSE.

SPECIFICATION forming part of Letters Patent No. 355,441, dated January 4, 1887.

Application filed November 12, 1885. Serial No. 182,510. (No model.)

*To all whom it may concern:*

Be it known that I, WILLIAM M. DUCKER, a citizen of the United States, residing in the city of New York, in the county of New York and State of New York, have invented a new and useful Portable House, adapted to be used as a barrack, field-hospital, &c., of which the following is a specification, reference being had to the accompanying drawings, which form a part thereof.

My invention relates to a structure which may be conveniently furnished with articles required for use in a barrack, field hospital, &c.—such as beds, tables, chairs, &c.—without adding to the space which it will take up when packed for transportation, which can be quickly set up and taken down by workmen of ordinary skill, which is so light that it may be easily transported in a convenient vehicle, readily adjusted to inequalities of the ground, which is protected against fire, may be conveniently heated and ventilated, and constructed cheaply.

Figure 1 is an interior elevation through the structure, about the middle. Fig. 2 is a view of one end of the structure from within, the under-floor shaft A shown in section. Figs. 3 to 7 are views of the dovetail locking devices by which the parts are secured together when the structure is put up. Figs. 8 and 9 are perspective views of the shed-roofs of the annexes. Fig. 10 is an elevation of the structure from without. Fig. 11 is an end view of the shaft A. Fig. 12 is a side view of one of the door-sills. Fig. 13 is a floor plan of the structure. Fig. 14 is a section of the floor on the line $x\ x$ of Fig. 13. Figs. 15 and 16 are side views of the meeting ends of the sections of shaft A. Fig. 17 is an end view of one of the meeting ends of the sections of shaft A. Fig. 18 is a detail view of the roof-section from within. Fig. 19 is a similar view of one of the sloping end sections. Fig. 20 is a similar view of one of the door-sections. Fig. 21 is a side view of the lintel. Fig. 22 is a view of the end of the ridge-pole, showing the key-pieces attached for adjustment to the parts G G. Fig. 23 shows a side and a section of the ridge-pole. Fig. 24 is a perspective view of one of the rafters. Fig. 25 is a view of the side of the annex R, with the hinged door caught back, ready for transportation. Fig. 26 is a section on the line $x\ x$ of Fig. 20. Fig. 27 is a portion of one of the side sections, B, showing arrangement for attaching it to the end section, F. Fig. 28 shows the joining ends in section of the parts of the ridge-pole. Fig. 29 is an enlarged view of one of the side sections, B C, showing the furniture arranged for transportation. Fig. 30 is a section on the line $x\ x$ of Fig. 29. Fig. 31 is an edge view of a part of the tray C, partly in section. Fig. 32 is a view of the tray B, showing the bed lowered to its position for use. Fig. 33 is a section of the lower ends of the trays B C, showing the extension-feet $m^3$.

Similar letters of reference indicate like parts in all the drawings.

I will first describe the structure of the size and proportions which I consider convenient for general use, and afterward modifications thereof which may be used under peculiar circumstances. This structure consists, essentially, of a central support or under-floor shaft, floor, sides, ends, roof, heating-annex, and earth-closet annex, and it may be furnished with beds, tables, chairs, &c.

A is an under-floor shaft, which extends from end to end of the main structure. It is the key or foundation from which the structure is put up, and it should be first properly adjusted in position on the ground where the barrack is to be set up. In practice it will usually be the only part of the structure for which the ground needs to be leveled. This, however, should be laid upon a properly-leveled strip of ground to give firmness and solidity to the whole. This shaft A is preferably made in three equal parts, each of which is eleven feet four inches long, the length of the whole being thirty-four feet, and it may be fifteen inches wide and nine inches deep. At suitable intervals its upper part is provided with openings A', as shown in Figs. 1 and 13, for discharging hot air or disinfectants into the structure, the end openings of the shaft being also protected against vermin by suitable screens, $g$, and having also a door, $h$, when desired, as shown in Fig. 11.

The meeting ends of the parts may be constructed simply to meet each other, or they may be provided with suitable portions to fit into each other, as desired. For securing these parts to each other, and also for holding the various other sections together, I employ the dovetail locking device shown in Figs. 3 to 7. This consists of two parts, which I call the "lock" and "key."

Y is the lock, (shown in front view in Fig. 3 and top view in Fig. 4,) and is a metal plate of suitable size and thickness, having countersunk screw-holes for attachment, and provided with the dovetail slot Y'.

Z is the key. (Shown in front view in Fig. 5, top view in Fig. 6, and side view in Fig. 7.) This key-piece also has countersunk screw-holes for attachment, and is provided with a dovetail locking projection, Z', to correspond to the slot Y', into which it fits snugly. These locking parts Y Z should be made of strong metal and accurately fitted to each other, for upon them depends in a great measure the perfect joining of the various parts. I prefer to make them of malleable iron. A suitable recess is to be cut into the wood above the slot Y', where necessary, to allow the key Z' to be inserted in the slot Y' from above. These lock and key pieces are attached, respectively, to each of the joining ends of the several sections of the shaft A, as shown in side view in Figs. 15 and 16 and in end view in Fig. 17, and preferably to a block, $A^2$, secured to the sides of the shaft for that purpose, so that when they are locked into each other the parts will form the entire shaft, with an even surface on the top, as plainly indicated in Figs. 1 and 13. To the sides of the shaft A, at regular intervals, are also attached the pieces Y Y, into which lock the corresponding key-pieces of the floor-sections. This shaft may be lined within with felt, lead, or tin, or it may be painted, if desired.

The floor consists of wooden sections made of light material, but of sufficient strength to support the weight that is to be imposed upon them, and I prefer to employ twenty-four of such sections, twelve on each side, in such a structure as I am describing. Each of the floor-sections is provided on each end with two of the key-pieces Z Z, those on one end to lock into the pieces Y Y on the shaft A, and those on the opposite end to lock into the side sections, B C. The floor-sections are further supported on the shaft A by a strip $A^3$, Figs. 15 and 16, which is attached lengthwise at the proper height on the shaft A.

For conveniently putting in and taking out these floor-sections, I provide them at each end with an ordinary screw-ring of suitable size, as indicated at $m\ m$, Fig. 13, countersunk to be flush with the surface of the floor. With a suitable hook inserted into the screw-ring any section may be conveniently taken up. This arrangement of the key-pieces Z Z allows the floor-sections to be put in from above, and by means of the screw-rings (indicated at $m\ m$) the floor-sections can all be taken up independently of each other when for any reason that is necessary—as, for instance, to adjust the extension-feet.

As shown in Fig. 14, which is a section on the line $x\ x$ of Fig. 13, each floor-section is also provided on one of its under sides with a supporting-lip, $m'$, and the side having such supporting-lip is also provided with a hinged foot, $m^2$, which may be dropped down when the section is in place, as an additional support for it upon the ground. To the foot $m^2$ is further attached an extension-foot, $m^3$, which is slotted to be adjustable by means of the set-screw $m^4$, as shown in section in Fig. 33. By means of the lip the parts support each other, and by means of the foot they are also capable of being supported upon the ground, so that the floor can be made firm and unyielding when the structure is set up.

The sides of the structure consist of the double sections B C, securely hinged together, as shown plainly in Fig. 29. Each of these sections consists of a strong wooden frame, $b\ b$, to one side of which—the outer side when in position—a suitable covering, C', is secured. This covering C' consists of three parts—first, a sheet of strong muslin or duck, thoroughly painted with asbestus or other suitable fire-proof paint, then a sheet of builder's felt or paper, and then another sheet of strong muslin or duck, painted as above stated. This covering forms each of these sections into a tray, which may be about three and one-half inches deep, two feet six inches wide, and six feet one inch long, inside measurements. The side pieces project a suitable distance below the tray as feet upon which the frames are to stand on the ground when put up, and to these I also attach extension-feet $m^3$, as shown in the drawings, like those employed for the floor-sections and already described, for firm adjustment on inequalities of the ground. To strengthen these frames or trays, I employ bracing-strips $b'\ b'$, disposed at about equal distances, as clearly shown. The side pieces of these trays are provided with the locking-pieces Y Z, by means of which they are secured together. The upper cross-piece of each tray is also provided with one of the lock-pieces Y, to receive the key Z on the end of the rafter, while each lower cross-piece is provided with two of such lock-pieces Y Y, to receive the keys Z Z on the ends of the floor-sections M M. The meeting faces of these side sections may also be tongued and grooved, as shown in Fig. 30, which is a section in the line X X of Fig. 29, and they may also be covered by a strip of felt, if desired.

The tray C has an opening of suitable size to form a window. On the outer side of this opening is attached a shutter, $C^2$, disposed to be flush with the outer face of the tray C, preferably slotted and hinged to swing outward, having a suitable hook or catch to secure it in place when closed; and to the inner side is hinged a glazed sash, to swing inward, also provided with a suitable catch to retain it in place when closed. The tray-shaped structure of the parts gives me depth enough for the shutter and for the sash without either projecting beyond the face of the tray C, so that it is not necessary to remove either the shutter or the glazed window in transportation, and by thus disposing the parts the glass is covered and protected by the shutter when the trays are folded together for transportation.

The tray C is furnished with a swinging table, I, hinged to the lower brace-piece, $b'$, so that it may be folded or turned up for transportation, and having a suitable supporting-strap, $i$, to sustain it in position when in use. In the panel formed by the lower brace-piece, $b'$, and the lower cross-piece of the frame a folding chair, $j$, may be disposed and held in position by a suitable catch. A candle-stick, $j'$, may also be conveniently attached to this frame to turn outward for use and inward for transportation.

The tray B is furnished with a cot-bed, B', having a pillow, $B^2$, which is capable of being folded down out of the way. At proper points on the inner sides of the uprights $b\ b$ cleats $a\ a$ are secured, upon which the head end of the bed is to rest when in use. The frame of the bed is attached to the sides of the uprights $b\ b$ by means of suitable straps, $a'\ a'$, which aid to hold it in position, and by which the head of the bed may be conveniently swung down and the foot up for packing and transportation. This bed is provided with folding legs $a^2$, near each end, and it may be detached from the straps $a'\ a'$ and used as a litter, or it may be set up outside of the structure when desired. To arrange the bed for transportation, the pillow $B^2$ is folded down out of the way and the legs at the foot folded up, as shown in Fig. 29, the frame is drawn outward away from the cleats $a\ a$, and the head of the bed is swung downward, suspended on the straps $a'\ a'$, until it rests upon the top of the lower cross-piece of the tray C, and the foot of the bed is turned up and secured by a suitable catch to the upper cross-piece of the tray. When the bed and table, &c., are folded in and the window closed, the sections or trays B C may be folded together, inclosing the parts, and suitably fastened together by a hook or other convenient device. These double sections B C form the unit of the side, and in the structure shown in the drawings six double sections are employed on each side.

The end of the structure consists, essentially, of the door-sections E E, corner sections, F F, and roof-sections G G, of which Fig. 2 is an elevation, looked at from within the structure, details of which are also shown in Figs. 18, 19, &c.

G G are two frames, of suitable size and configuration to form the slope for the roof, and they are also covered with the same materials, C', as the side sections, B C, already described, and are hinged to fold together, inclosing within them the glazed windows $C^3$, which are protected on the outer side by shutters, as already described.

The corner sections, F F, correspond in structure to the window-sections C, having in addition thereto the upper sloping panel, F', to complete the slope of the roof. The lower ends of the frames of these sections are also to have the extension-feet $m^3$ and appropriate set-screws. These corner sections are not hinged, however, but are to be laid together, inclosing the glazed windows for protection, and then hooked or otherwise suitably secured together for transportation.

The door-sections E E are provided on the upper face of the lower cross-piece and on the lower face of the upper cross-piece with metal tongues $d\ d$, the upper and lower faces of the door H being correspondingly grooved to slide on these tongues. These sections are also provided with bracing-pieces $b^2\ b^2$ on their inner sides, opposite the bracing-pieces $b'\ b'$, and between these pieces $b'\ b^2$ moves the sliding door H. The strip $e$ also, instead of being three and one-half inches thick, as the corresponding strip on the side sections, is wide but thin, and a corresponding strip, $e'$, is secured opposite to it on the other side, the door also moving between these pieces, as shown in Fig. 26, which is a section on the line X X of Fig. 20. For transportation the door H is moved into the section E, and there secured.

K, Fig. 21, is the lintel over the sliding doors, locking into the upper part of the frames E E on each side by means of the dovetails Z Z, binding the frames E E together at the top. At the bottom these frames E E are bound together and to the shaft A by means of the sills L L, which are also provided with the keys Z Z to lock into the slots Y Y on the shaft A and strip $e$, as shown in detail in Figs. 11 and 12. To give additional support to the sills a cleat, $f$, is secured at the proper point on the shaft A, upon which their inner ends rest. The sills and top of the shaft A on the proper line are also provided with tongue-pieces $d\ d$, to guide the door. The sections E E F F and folding sections G G are preferably fastened together by means of bolts and nuts $c\ c$ in putting up the structure, as shown in the drawings. The joining faces of the parts F and B, as shown in Figs. 19 and 27, are also provided with the lock and key pieces Y Z, by which they are to be secured to each other in setting up the structure, and where the wood of any of the frames is not of sufficient thickness to allow these pieces to be securely attached a re-enforcing block, $o$, is employed, as shown in the drawings.

The roof consists of a suitable covering and proper supports therefor. The arrangement shown in the drawings consists of a ridge-pole, N, of the proper length, made, preferably, in three sections and having the joining ends locked together for use by means of the pieces Y Z, as shown in Fig. 28, which are sectional views, on a larger scale, of the joining ends of the ridge-pole sections. The ridge-pole is supported by posts P P, which are placed beneath the joined ends of the parts, as indicated in Fig. 1. The extreme ends of the ridge-pole are fitted with key-pieces Z Z, as shown in Fig. 22, to lock into the slotted pieces Y Y in the upper parts of the roof-sections G G at each end of the structure, as shown at Y in Fig. 18, and thereby the upper parts are held together.

At suitable intervals on the ridge-pole are secured the pieces Y Y, to receive the key-pieces Z Z on the ends of the rafters O. Instead, however, of screwing the pieces Y Y to the wood of the ridge-pole, they are set opposite to each other and screwed together through the wood, as shown in Figs. 23, which show, respectively, a sectional and a side view of the ridge-pole N, indicating the method of securing these locking-pieces Y Y to the pole.

The rafters O O are beveled to fit against the side of the ridge-pole N and against the upper sides of the frames B C, and are provided at each end with the key-pieces Z Z, as shown in Fig. 24, which is a perspective view of a part of one of the rafters, by means of which their ends are secured, respectively, in the locks Y Y on the ridge-pole N and on the side sections, B C, the locking-pieces on the side sections being about the middle of the upper cross-pieces, as shown in Fig. 29.

The roof D consists of a strong canvas, which may be made water and fire proof by means of suitable paint, and this is spread over the structure and buttoned or otherwise securely fastened in position.

In use with the main structure I also employ two additional chambers, R S, one at each end, the chamber R forming a suitable storm-house and chamber for the heating apparatus, while the chamber S is arranged for use for an earth-closet or water-closet, &c. The chamber R is formed of framed sections $w\ w$, made in the same manner and of the same material as the sections B C, and provided with the lock and key pieces Y Z where required to attach the parts to each other and to the ends of the main structure. This chamber R is provided with a hinged door, $v$, which folds into the section to which it is hinged, and is buttoned back, as shown in Fig. 25, for convenience in transportation. This chamber is provided with the roof $r$, Fig. 8, consisting of a frame suitably covered and provided with hooks $t\ t$, by which it is attached to the side pieces of the chamber R and also to the end of the main structure. In this chamber I arrange the heating apparatus, which may consist of a stove inclosed in a large drum, the stove-pipe projecting out of the chamber R at any desired point, and the drum being provided with one or more flues, which may enter the main structure through the holes $l\ l$ (shown in Figs. 2, 18, and 20) and there discharge the heated air.

When the nature of the ground admits of it, the heating apparatus may be arranged in such a position as to discharge the heated air through the under-floor shaft A. Like the side sections, B C, the lower ends of the parts may also be provided with the adjustable feet $m^3$, and this chamber may be provided with a floor, if desired, though, generally, the floor may be omitted. This chamber R has only three sides, being open toward the main structure, and may be used as a storm-house or as a heating-room.

By providing this heating-reservoir outside of the main structure the dust, noise, and commotion of heating the apartment are avoided, which is very important when the invention is used for hospital purposes, and the space, also, which the heating apparatus would occupy is preserved. The outer chamber also acts as a storm-house to protect the door-opening, and it may be stored during warm weather.

The chamber S consists of similar side pieces, $w\ w$, and roof $s$, and is preferably furnished with a floor consisting of a section of suitable size constructed and attached by means of the locking devices Y Z, like the sections M. It is furnished with two doors, $u\ u$, which are folded back and secured in their appropriate sections, $w\ w$, for transportation. (See Figs. 1 and 13.) By means of these doors this chamber is inclosed on all sides, and may be set up at some distance from the main structure when desired. In it the earth-closet or other suitable conveniences are to be arranged.

In the foregoing specification I have described a structure which I consider to be preferable for general use, and most convenient, on account of its lightness, for transportation; but I do not limit myself to such a structure, as it is evident that my invention may be readily applied to structures of a different form and made up of different materials.

I have described canvas and similar materials as suitable for covering the sides, as these are light and comparatively cheap materials, and such as I consider the best for general purposes, especially for hospital use in the case of epidemics, as the whole structure can then, after use, be conveniently and entirely destroyed, if desired; but in cases where the structure is designed for permanent use, and the cost and convenience of transportation are not of so much consequence, the coverings for the sides and roof may consist of sheet metal —such as tin, zinc, sheet-iron, &c.—which will render the structure much stronger and more enduring.

What I claim as new, and desire to secure by Letters Patent, is—

1. A portable house consisting of a central longitudinal section, A, floor-sections M, and side sections, B C, in combination with suitable end sections, ridge-pole N and supports, and roof D, substantially as described and shown.

2. In a portable house, a shaft, as A, provided with suitable locking devices to support the floor centrally, substantially as described and shown.

3. In a sectional house, a central longitudinal part, A, adapted to support the centrally-disposed ends of the floor-sections, in combination with floor-sections provided with suitable devices, as the feet $m^3$, adapted to adjust the outer portions of the sections to the inequalities of the ground, substantially as described.

4. In a portable house, a floor consisting of sections M M, provided with key-pieces Z Z, adapted to permit the sections M M to be lifted up out of place independently, substantially as described and shown.

5. In a portable house, the floor-sections M, provided with lip $m'$ and adjustable feet $m^3$, substantially as described and shown.

6. In a portable house, the roof, as D, ridge-pole N, supports P P, and rafters O O, in combination with the trays B C and suitable end sections, E F G, substantially as described.

7. In a portable house consisting of suitable sides and roof, the end sections, E E F F, and roof-sections G G, substantially as described and shown.

8. In a portable house, the door-section E, tongue-pieces $d\ d$, and sliding door H, substantially as described and shown.

9. In a portable house, the trays B C, adapted to fold together and inclose a suitable packing space, substantially as described and shown.

10. In a portable house, the tray-sections C, with window-openings therein, in combination with a suitable shutter, $C^2$, to swing outwardly, and glazed sash $C^3$, to swing inwardly, substantially as described.

11. In a portable house, the tray, as B, provided with a bed adjustable thereto and adapted to fold into the same, substantially as described and shown.

12. In a portable house, the tray, as C, provided with the hinged table I, adapted to fold into such tray, substantially as described and shown.

13. In a portable house, the sections A, B, C, E, F, G, and M, in combination with the plates Y, having dovetailed slots $Y'$, and plates Z, having corresponding dovetail projections, $Z'$, substantially as described and shown.

WILLIAM M. DUCKER.

Witnesses:
　EDWARD H. WARD,
　VANDENBURGH CHEVALLIER.